United States Patent
Mischenko et al.

(10) Patent No.: US 6,928,552 B1
(45) Date of Patent: Aug. 9, 2005

(54) METHOD AND SYSTEM FOR AUTHENTICATION OF ARTICLES

(76) Inventors: Valentin Alexandrovich Mischenko, 28-210, Nekrasova Str., Minsk (BY), 220040; Ihar Anatolievich Hrishanovich, 5-39 Lunacharskogo Str., Minsk (BY), 220071

( * ) Notice: Subject to any disclaimer, the term of this patent is extended or adjusted under 35 U.S.C. 154(b) by 0 days.

(21) Appl. No.: 09/890,846
(22) PCT Filed: Dec. 8, 1999
(86) PCT No.: PCT/BY99/00011
§ 371 (c)(1), (2), (4) Date: Oct. 16, 2001
(87) PCT Pub. No.: WO01/43086
PCT Pub. Date: Jun. 14, 2001

(51) Int. Cl.[7] .............................................. G06F 11/30
(52) U.S. Cl. ...................................... 713/200; 713/201
(58) Field of Search ................................. 713/200, 201

(56) References Cited

U.S. PATENT DOCUMENTS

| | | | |
|---|---|---|---|
| 5,475,205 A | 12/1995 | Behm et al. | |
| 5,592,561 A | 1/1997 | Moore | |

FOREIGN PATENT DOCUMENTS

| | | |
|---|---|---|
| EP | 0 889 448 A2 | 1/1999 |
| WO | PCT 98/19869 | 5/1998 |

*Primary Examiner*—Thomas R. Peeso
(74) *Attorney, Agent, or Firm*—Brooks Kushman P.C.

(57) ABSTRACT

A method for marking comprises applying a unique image (3) on to the surface of the article or a label. The surface for applying an image should have a rough texture. The applied image is scanned by the scanner (6) and encoded. The code (4) is applied on to the label next to the image. The code data and the image data are transferred to the remote control center. Authentication is performed at the checking terminals located in public.

20 Claims, 5 Drawing Sheets

METHOD AND SYSTEM FOR AUTHENTICATION OF ARTICLES

FIELD OF THE INVENTION

The present invention relates to the technique of protection of articles from counterfeiting, and may be used for protection from counterfeiting and unauthorized copying of goods, documents, securities, etc.

BACKGROUND OF THE INVENTION

A wide variety of methods for protection of documents and other goods from counterfeiting by means of marking them with special marks or labels are known in the prior art.

In some cases such marks are made of a special material having specific properties, e.g., a material that may be fluorescent in a particular light spectrum (U.S. Pat. No. 5,719,948 Apparatus and methods for fluorescent imaging and optical character reading), a material with magnetic features (U.S. Pat. No. 5,697,649 Articles employing a magnetic securities feature), or a material exhibiting anisotropy during absorption, reflection, transmission (U.S. Pat. No. 5,568,251 Authenticating system.), etc. Such materials may be also applied or included into a composition of a mark forming a particular figure, combination etc.

However, neither of the methods is able to provide total anti-counterfeit protection, since a pirate can recognize a material and use the same technique or even a higher one.

The other group of methods is based on the unique physical or chemical characteristics of a surface of a document or a product. For this purpose a section of the surface to be protected is scanned in accordance with the selected physical characteristic of a surface (WO97/24699 Authentication of articles). The scanned image is encoded and/or encrypted, and the obtained result is applied to the surface of an article or a document in the form of a numeral or a code. In the course of checking the authenticity, the surface is scanned by the testing device. The data obtained after scanning are processed by the same method, the code applied to the surface is decoded and/or is decrypted and compared to the result of processing of scanning.

Scanning of physical characteristics requires elaborated physical devices. The characteristics can have a wide physical range of variations and a high level of background characteristics. This fact makes their use rather expensive and reduces the degree of estimation validity. The major problem consists in determining the area of scanning, since use of the physical characteristics of a surface does not limit the scanning area to the proper physical characteristics impeding possibility of re-getting to the same region. Moreover, the encoding systems now in use, fail to provide a sufficient crypto-resistance of encoding, and the used keys may be restored for counterfeiting.

Specially structured materials, comprising randomly distributed fibers or other contrast inclusions that are easily readout by optical devices set for transmission or reflection (WO98/57299 Document with an authentication feature), are used for more reliable determination of random characteristics of a surface. In this case the scanning area is limited to special patterns or windows, that are applied to the surface of a label made of a structured material.

The labels of the kind may be manufactured and tagged to articles or documents. However, during re-readout the bulk structure and optical characteristics of fibers may cause errors leading to uncertainty of identification, on the account of errors in determining scanning areas, as well as because of inaccuracy in measuring medium characteristics. Moreover, such identification system requires elaborated equipment for precise determining of spatial optical characteristics. The similar system uses a label with randomly (irregularly) disposed dichroic fibers. Information on the producer, characteristics of the goods and information on the encoded result of scanning is disposed next on a label (WO99/17486 System and method for authentication of goods). However, the system requires special reading equipment for determining the optical characteristic of dichroity of fibers. In addition, disposition of fibers in the medium and inaccuracy in determining binding of fibers may result in considerable inaccuracies during re-readout while testing.

Additionally, during analysis of a great number of tags, the encoding system may also be "opened", and tags may be counterfeited or simply transferred from original goods to counterfeited articles.

Prior art also discloses methods of protection of documents from copying by means of applying nonreplicable pitches to an image, e.g. press printed lineatures, etc. (U.S. Pat. No. 5,018,767 Counterfeited protected document; U.S. Pat. No. 5,193,853 Nonreplicable document and method for making same).

However, the said methods do not allow to identify quickly the article that may be counterfeit.

Methods and systems for protection of documents and postal matters from counterfeiting are also disclosed in the prior art. (U.S. Pat. No. 5,970,151 Method and arrangement for generating and checking a security impression) in accordance with the patent, specially encoded images and digits are applied to a document or to an envelope; the data on the said images and digits are stored in a remote control center. During checking a document image is scanned, encoded and transmitted to the data storage center, the data are compared to the stored value. Thereafter a conclusion on authenticity of a document is drawn.

The printed contrast image facilitates readout and increases reliability of identification of marking. Moreover, such methods provide a rather reliable control of document passage. However, the marking of the kind may be copied and applied onto another document, i.e. it may be counterfeited by substituting a document.

The prior art authentication systems generally comprise at least two remote scanners, a printing device, data processing means and communication means.

In the prior art systems a printing device imprints information and a code. Moreover, in the system under the U.S. Pat. No. 5,970,151 the printing device imprints an encoded image, as well as a sequence of bar codes or terminal codes.

The described systems require the elaborated scanning equipment and special composite mediums (materials) for reliable re-scanning under testing. On the other hand, increase of image contrast and reproducibility of repeated scanning in existing systems magnifies probability for copying and counterfeiting.

The closest technical solution for the system under the present invention is the system and method of marking goods disclosed in the U.S. Pat. No. 5,592,561. The said system comprises a control computer, a main computer, a marking system and a testing reader, all of the devices being compatible and connected by a communication system. The marking system comprises a printer, a reader, and a processing and control unit that is connected to the main computer by a modem. Marks in the form of a two-dimensional encrypted image are imprinted on an article or on a material the product is made of.

The image may be scanned by a reading device and encrypted in the form of encrypted data. Then the data are compared with the authentication data of the database, or the data are decoded and compared with the data stored in the central database of the main computer.

The marking system ensures control of image printing by means of a certain number of authentication codes, which should be applied prior to that, when the re-authentication is required. When printed, the encoded image is scanned and recognized as a true one in the central database. Then the image may be stored in the database together with the relevant information referring to the said particular product.

During checking goods, alongside with authentication the goods are tested in respect of duplication of unique codes, whereby counterfeited goods are so detected.

The system provides a fairly sharp and easily readout image. Nevertheless, the system is not able to defend the producer from counterfeiting in a full scope, since an image is easily reproduced, and a counterfeited copy of a product may happen to be the first one during re-testing of mass goods.

The aim of the invention is development of a reliable method and system for recognizing of marking, uniqueness of marking, as well as control of movement of goods.

SUMMARY OF THE INVENTION

The present invention develops new methods for marking articles and authentication the same, as well as a system for checking and authenticating, i.e. checking the genuiness of origin of goods, articles and documents.

The main aim of the invention is providing a marking means that is, on one hand, capable of ensuring a unique marking and impossibility for counterfeiting of the marking, and, on the other hand, is satisfactory secure and simple in technicality of recognizing unique marking.

The aim of the invention is realized in the following way. Marking of articles is performed by the steps of:
  generating private keys;
  storing the said keys in the database;
  generating an image for each sample of an article;
  applying the image on the marked surface;
  reading the resulting image;
  obtaining data on the read-out image;
  encrypting the said obtained data;
  applying the resulting code onto the marked surface.

The method is also characterized by that a unique image is generated as a random at least two-dimensional image; and the said generated random two-dimensional image is applied on to a selected area, made of a material that has a rough surface with random characteristics;

Various materials may be used, e.g. materials having a rough surface, fibrous, porous material, materials with inclusions of particles, etc.

In this case the cheapest materials are fibrous materials, including rough paper, cloths and other household materials. The said materials ensure impossibility of any copying, whereas a completely another image is produced, under re-applying any image on a surface of a random texture. This is due to the fact that, in the process of dyeing, a distribution of coloring or any other marking agent is essentially influenced by the texture. On the other hand, the intensity of reflected light also substantially influences image characteristics during reading. Thus, the image of this kind may produce a completely different identification data when readout. In this case the counterfeited article will be immediately identified. Accordingly, marking of this type provides both the unique character of marking and impossibility for any replication by modern technical means, providing also the unique character of the identification code applied next to the marking image.

Further improvement of the invention is performed according to the following distribution of functions for the constituent parts of the system:
  generating private keys, data encrypting and data storing is effected in a remote control center;
  applying the image, scanning the resulting image, and applying the encrypted code is performed by a marking means;
  data exchange between the marking means and the control center is effected over communication channels;

The abovementioned distribution of functions provides protection from counterfeiting by safe storing the encryption keys, which are designed for creating protection codes applied onto a label next to the identification image. The individuality of keys prevents possibility of encrypting any other randomly generated counterfeiting images.

According to another embodiment of the invention a producer or a supplier may take up the running of protecting marking. In this case the functions may be distributed as follows:
  generating private keys, data encrypting, generating a random image, applying the image on to the marked surface, reading the resulting image and applying the encrypted code on to the marked surface is performed by the marking means;
  data transferring to the control center is also effected by the marking means, while at least keys are transferred to the control center over the path providing confidentiality;
  the control center stores the keys and codes in the database.

In this case the control center provides only the monitoring and checking function.

The other method for obtaining a unique marking image that frames conditions for impossibility of reproducing and counterfeiting, is a variant of embodiment, according to which, using the same actions and data processing sequence, a random image is applied onto a surface, that is further modified for forming a texture with random parameters. In this case, a random two-dimensional image is applied to the surface, which is further modified, gaining as a result the similar anti-counterfeiting features as in the previous case. Preferably, the surface therewith is modified until a steady texture with random parameters is formed.

The aforementioned surface modification may be effected by any of the beneath disclosed methods or by equivalent techniques, e.g. by perforating. In this case, the texture and its random parameters are formed at the edge of openings on account of both—erosion of the edge and it's matching with random image elements and their parts.

Perforating may be also performed by electrospark machining. In this case distribution of openings is also random and nonreproducible.

The surface may be also modified by texture impression, by analogy with seals, pressing means, etc.

Further means for image modifying and providing nonreproducibility may be the use of a porous material with capillary features. In this case, porosity defines a texture existence, while the image is modified in a random way on the account of irregular re-distribution of a liquid colorant throughout irregular layout of capillaries.

The articles marked in accordance with the present invention are identified in the checking terminal. In this case, the following prior art operations are fulfilled:

reading a marking image;

reading an encrypted code;

decrypting the encrypted code for data recovering;

comparing the recovered data with the readout image data.

Unlike the prior art authentication methods, according to the present invention the criterion of existence of a respective texture on an image is specified, when identifying, thereafter the image is readout. In accordance with one embodiment, functions between the checking terminal and the control center are distributed as follows:

specifying the feature of texture existence, reading the marking image and reading the encrypted code is effected in the checking terminal; the readout image data being transferred to the control center;

decrypting (recovery of the image data against the readout code), comparing the recovered image with the data of the readout image is effected in the remote control center.

According to another embodiment reading the marking image, reading the encrypted code and specifying the criterion of texture existence is effected at the checking terminal; the readout image data being transferred to the control center;

decrypting (recovery of the image data against the readout code) is effected in the remote center, and the recovered result is transferred to the checking terminal;

comparing the recovered data with the readout identification image data is effected in the checking terminal.

In the described authentication systems, the additional criterion, i.e. existence of a texture on a surface, is the decisive criterion for starting the identification process. The said criterion closes out marking imitation of by means of exact reproducing of a flat sample (copy) of the original marking. Texture existence conditions impossibility of any counterfeiting, as in the process of applying an image on to the texture surface the resulting image changes in a random way, and cannot correspond to the original image.

Actually, during image readout, some deviations may occur between the first and the second readout. The deviations are conditioned by both—the endurance of the label and by the characteristics of the reader. The deviation limits may be preset as they are established in accordance with practice or tests. Therefore, modern identification methods generally compare characteristics of the obtained images, but not of the obtained codes. In the process of comparing errors are estimated. Decisions are made on basis of the pre-set criterion.

In general, in accordance with the present invention, the whole process of identification of articles, starting from marking to making decision on authenticity of an article, together with testing passing of products and search for counterfeiting products, comprises the following steps:

pre-marking of articles;

reading the resulting image;

data encrypting;

data storing in the control center database;

re-reading (checking) the unique image;

data transfer to the control center;

data comparing with the data stored in the database;

The said method differs from the prior art methods by that a marking image is obtained by the following steps:

generating a random unique image as at least a two-dimensional image;

applying the generated random image to a surface having a roughness with random parameters;

reading the resulting image;

transferring data on the read-out image to the remote control center;

generating private keys;

encoding the obtained unique image data by means of private keys;

transferring the resulting code to the marking station and applying the code onto the marking surface;

storing the keys in the control center database;

verifying the existence and the pattern of the texture on the marking surface in the checking terminal; and then test reading of the marking image and the applied code;

transferring the data on the code to the control center;

decrypting the data on the code and recovering the data on the readout image;

transferring the recovered data to the checking terminal for comparing them with the data on the readout image, and making decision on the authenticity of the article.

The said embodiment of the invention is preferable, as it reduces the traffic value for communication network. At the same time, while comparing image data at the checking terminal, i.e. at the unit of storing direct information on the checked article and its state, one may estimate the situation more objectively. In addition, when considerable deviations in quantitative characteristics are registered, it is possible to check some other articles from the series.

On the other hand, image data may be also transferred to the control center for comparing the data obtained at check scanning with the data, recovered against the obtained code. The said method is characterized by that a unique marking image is obtained by the steps of:

generating a unique image as a random at least two-dimensional image;

applying the generated random image to a surface having a texture with irregular parameters;

reading the resulting image;

transferring data on the read-out image to the remote control center;

generating private keys;

encrypting the obtained unique image data by means of private keys;

applying the resulting code on to the marking surface;

storing the keys and the unique image data in the control center database;

verifying the existence and the pattern of the texture on the marking surface in the checking terminal; and then rest reading of the marking image and the applied code;

transferring the readout data to the control center;

decrypting the data on the code and recovering the data on the read-out image;

comparing the recovered data with the image data received after the test reading;

transferring the results of comparing to the checking terminal.

Further improvement of the method for identification of articles and monitoring of product passing with a view of determining counterfeited articles and timely preventing of infringement is characterized by that the control center stores data on the checks performed, a number of checks of one and the same code being registered, when the set value of checks being exceeded, a signal informing on the recurring request is produced.

For technical implementation of the aforementioned methods, there may be created systems for identification of goods, consisting in an equipment complex, and their structure comprising:

a marking station, an control center, checking terminals;

communication means;

data transfer media.

The system for authentication of articles comprises a marking means including a printer, a printer control device, a readout device, an image processing unit, a communication means and a remote control center and a checking terminal comprising a key generating unit, encoding/decoding unit, a memory unit, a compare facility (decision-making unit), and blank parts for labels. In accordance with the present invention the marking device further includes a random image generating device, means for applying an encrypted code; as blank parts for labels are used substrates made of material having a texture with random parameters.

In general, implementation of the proposed method results in a new positive effect, which is characterized by the following.

On the one hand, reliability of multiple readout is magnified due to generating and applying on the identified surface of the image having the characteristics that are optimal for qualitative multiple readout.

In this case the scanning area of the protective image is precisely localized, since the applied image has a good contrast in comparison with the remaining surface.

On the other hand, storing of the private keys in remote processing center magnifies the degree of reliability for storing private keys, which are never transmitted to open checking terminals, and in general, may be transmitted nowhere at all.

In addition, use of a texture substrate or any other random three-dimensional image transforming, practically excludes any possibility for simple copying of labels. In this case the structure of the surface by itself serves as an additional criterion for pre-identification (visual identification).

In accordance with the present invention some more advantages may be achieved by further development thereof.

Additional testing of labels in the view of replication-prevention still further boosts the degree of anti-replication protection, providing thereby effective detection of counterfeiting cases. Thus, for example, if the infringer "selected" a possibility for reproducing or otherwise counterfeiting the labels in one or several variants, then frequent appearing of identical labels may be detected and localized.

Figure 1:
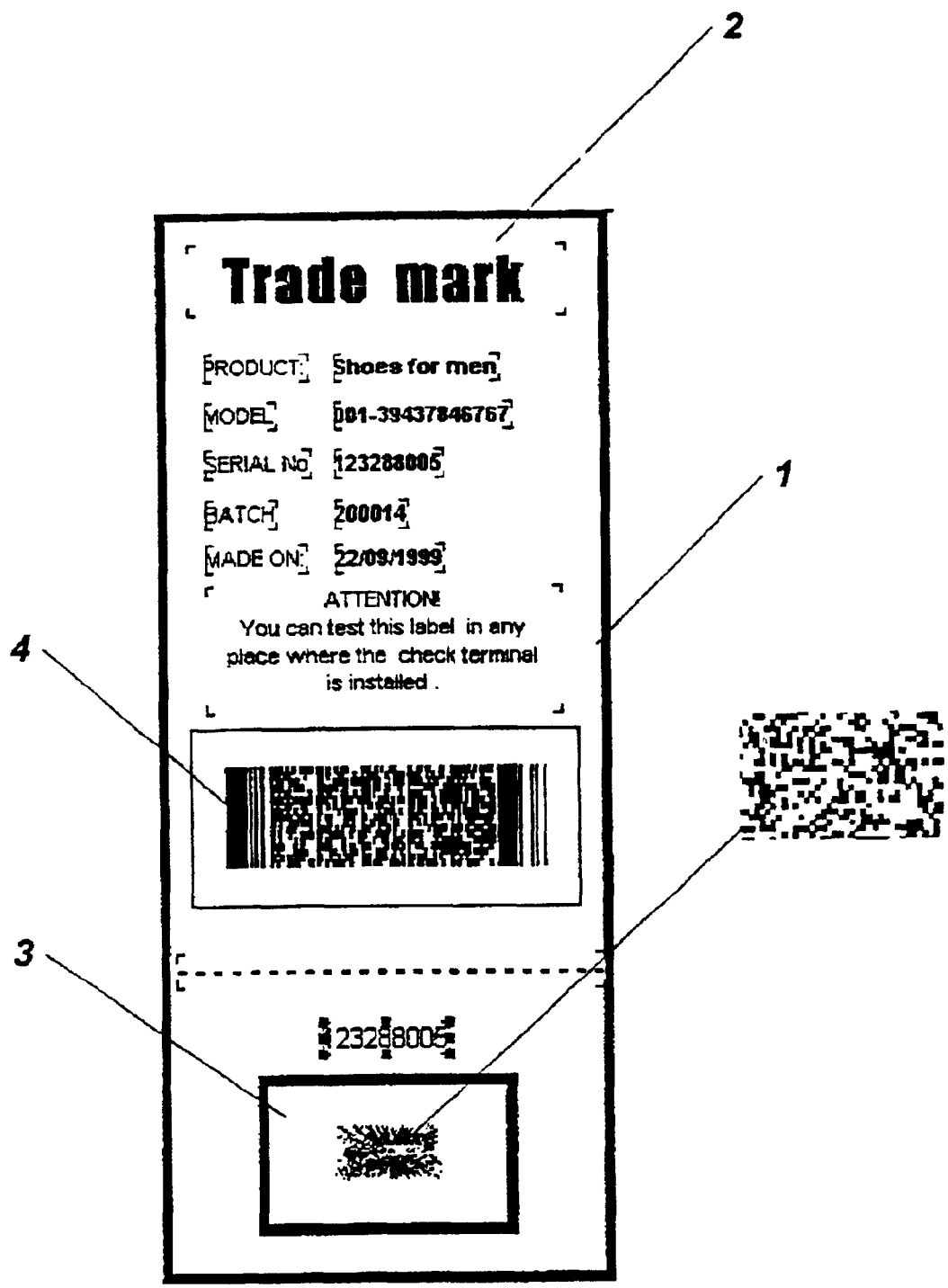
FIG. 1 shows a label containing an applied image and a bar code.

The method and the system according to the invention will be better understood by an example of a label shown in FIG. 1

A label is a card attached to an article or a document and may be coupled to it in a one-piece fashion.

A label may contain general information 2, i.e. a trademark, kind of an article, its parameters etc. Additionally, a label may also comprise an identifying image 3 and its encrypted image in the form of a bar code 4. The said bar code may also contain some other service information about keys, a serial number, etc. The surface in the area of the identification image may be covered by a special material providing roughness of the said surface.

Figure 2:
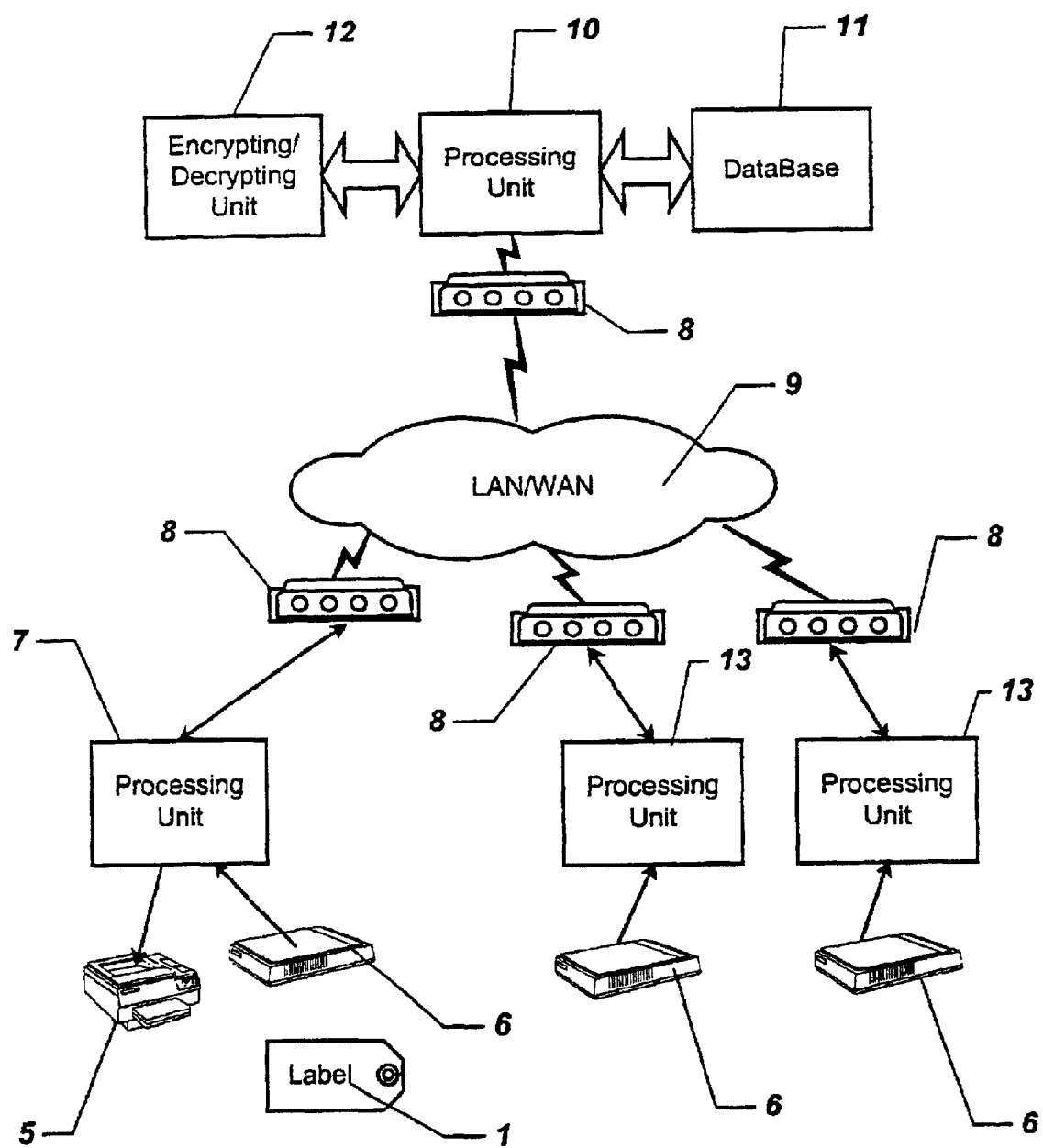
FIG. 2 shows a general scheme of the system for authentication of articles or documents.

In general, the identification system, as shown in FIG. 2, may be delivered in a computer variant with of special or universal processors. In this case the system comprises a marking device, which includes at least a printer 5, a scanner 6 and a marking processor 7 that functions for random image generating, for data processing and printer control, and a means for data transmitting 8 over a distributed or local network 9. The control center comprises a central processing unit 10 and at least a memory device 11 for storing of database, and an encoding/decoding unit 12. Over communication means 8 the said center is also inline (online) to the worldwide or local data transmitting network 9.

The said center is further connected to the remote checking devices, each of them comprising at least a communications means 8, a scanner 6 and a data processor for checking 13.

The system may also comprise a set of blank parts for labels.

Figure 3:
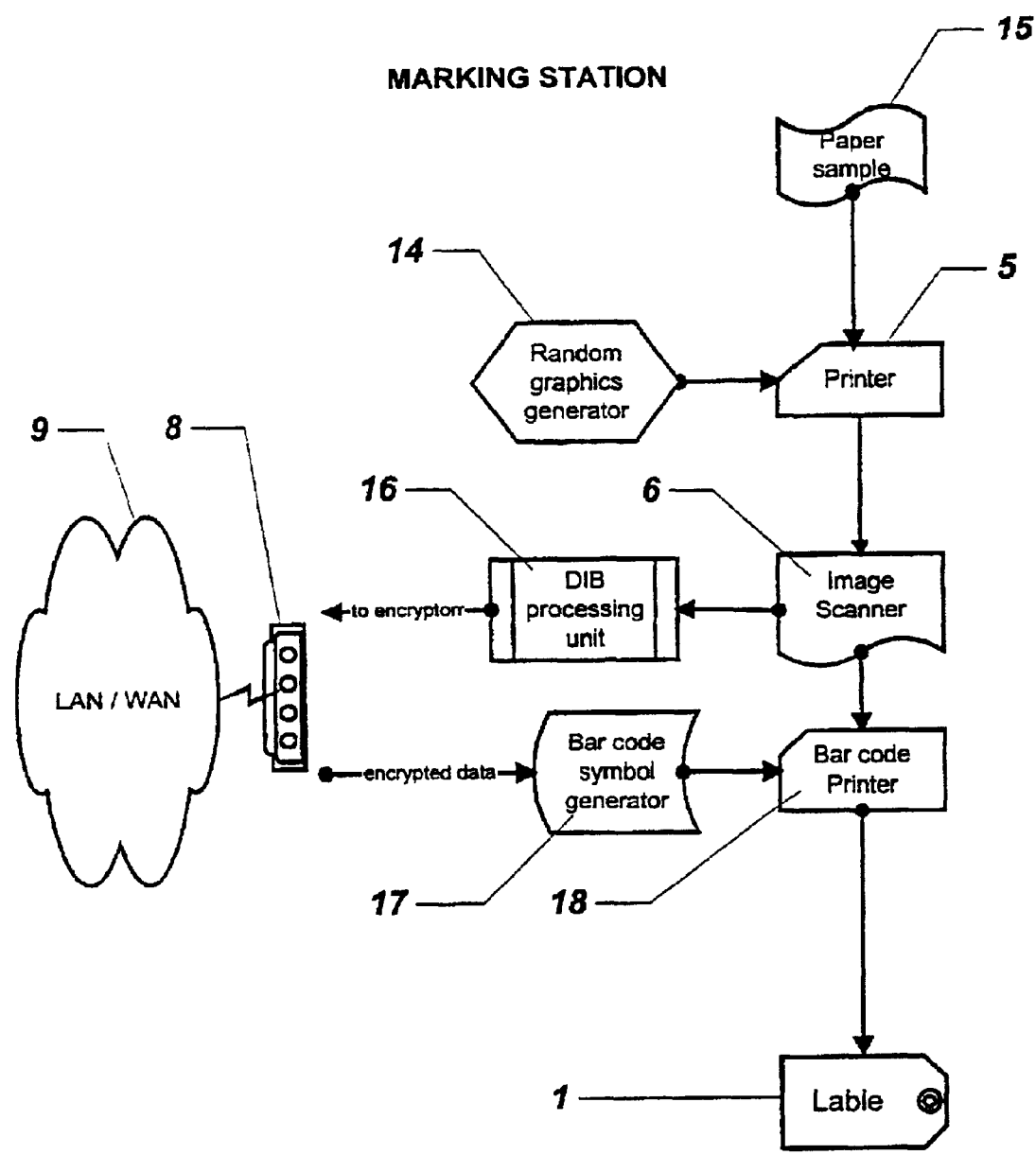
FIG. 3 shows a block scheme of the marking station.

In accordance with the invention an image (picture) is generated by the image generator 14 in the marking station, as shown in FIG. 3. The image comprises dots, randomly "scattered" within the limits of the set area of dots (pixels), or fully consists of the said dots; each dot is assigned its own color, which is randomly sampled every time from an n-color palette.

The generated image is imprinted on to a surface of a label with the help of a jet or laser printer 5 having a 300 dpi resolution.

The substrate 15 for a label is made of a material with a relief surface, such as friable paper, fabric or porous material. The obtained image may be randomly transformed by means of a special device in the process of printing or after the same. The surface texture of these materials is distributed in a random way. Therefore, unlike a generated image, dyes or printer toner filling surface irregularities is re-distributed. Additionally, in the process of further readout reflection characteristics vary according to texture inclination.

The image has still one more advantage. In the process of replication to a similar surface, toner particles arrive in other conditions, and, accordingly, the image varies again, and cannot be copied in facsimile on a similar surface because of mismatch of a random surface texture with the image element of the original.

The imprinted image may also be transformed in another way, e.g. by perforating, expansion or compression, heat treatment, etc.

In these cases important is the spatial structure of a substrate, since a structure is the main bar for prevention from identical copying, serving thereby as a additional authentication criterion.

When the said image is imprinted, the area is scanned by the scanner by the scanner 16 of a 300 dpi resolution, 256 shades of gray.

As a result of scanning, a raster array of an 8 bpp color depth is obtained.

The resulting array is processed in DIB (device independent bitmap)—processo 16 according to the preset rule, e.g. by interleaving to fractions according to colors. Pixels of some fractions are excluded from the total number of the array pixels. The number $N_1$ of the other pixels is defined together with their average color intensity $$N_2=(C_1+C_2+\ldots C_{N1})/N_1$$

The line of symbols obtained by concatenation of line expressions of hexadecimal representation of $N_1$ and $N_2$, is the image representation. The said line of symbols is encrypted by a private key, e.g., as disclosed in PCT/99BY/00004 (MZ4).

Figure 4:
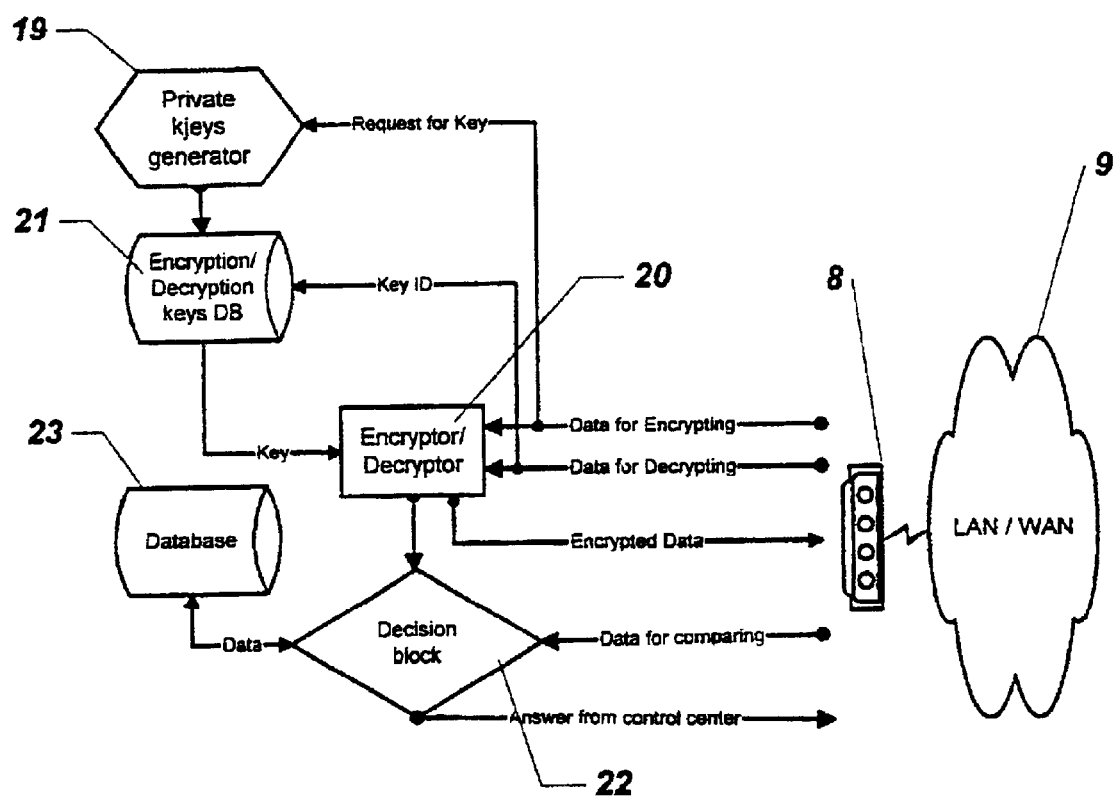
FIG. 4 shows a block scheme of the checking terminal.

A private key may be either generated in the marking station or transmitted to control center, or it may be obtained from the control center, shown in the FIG. 4. In this case, an individual private key is generated by the key generator 19 for every marking terminal. To provide higher security, in particular, for marking individual objects, an image representation may be sent for encrypting to the control center. Then, the obtained encrypted image representation is transmitted from the control center to the marking station. As shown in FIG. 1, the bar code generator 17 transforms the encrypted image representation into a bar code, which is imprinted by printer 18 to the label surface next to the image as a bar code 3.

As shown in FIG. 4 the control center includes input/output communication units (modem) 8, a code generator 19, an encode/decoder 20, a compare facility 22 (that may be also located at the checking terminal), a memory device 23 for storing data on the carried out tests, etc.

When data on the testing image arrive from the marking terminal at the input of the control center, the key generator 19 generates a private key, which is stored in the database 21. Then the private key is transferred to the encoder/decoder 20, where the image representation is coded and transferred back to the marking station for imprinting to a label as a bar code 3.

If the code data arrive at the input of the control center from the checking terminal, the encoder/decoder 20 requests the database for a key in accordance with ID of the bar code. The respective key arrives at the decoder 20, which recovers (decodes) the image data. Thereafter, the said data are transferred through the compare facility 22 to the decision-making unit 25 of the checking terminal, as shown in the FIG. 5.

Testing data are stored in the database 23. In case some bar codes occur often, the unit 22 blocks transmission of the recovered image representation and issues a counterfeit signal.

Figure 5:
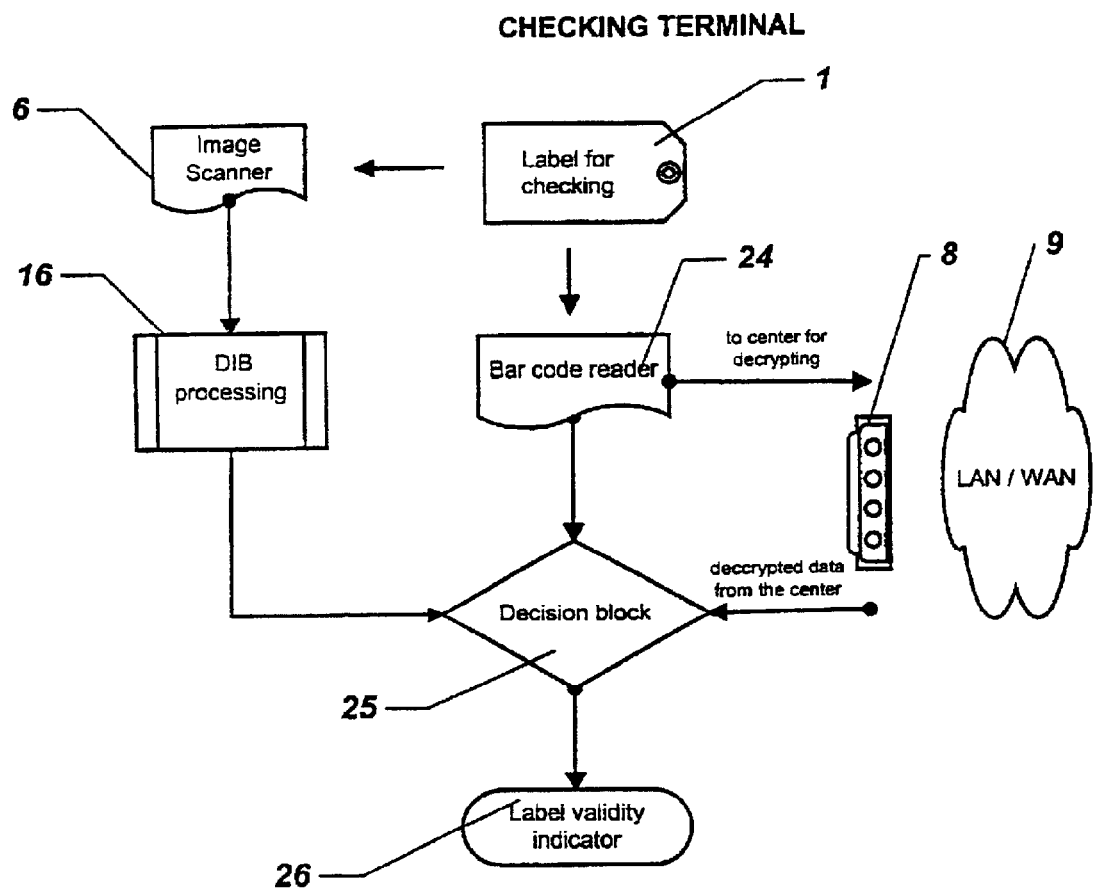
FIG. 5 shows a block scheme of the control center.

As shown in FIG. 5, the checking terminal is equipped with a bar code reader 24, an image scanner 6, a DIB (device independent bitmap) processor 16 for image identification, an input/output unit of the communication channel 8, and a compare and decision-making device 25. In the checking terminal the protection image 2 is scanned, and the protective bar code 3 is readout.

The value of a bar code 3 of the encrypted image representation is readout and sent over a communication channel 9 to the control center.

The control center selects the relevant key from the memory device 21 of the key database, decodes the set value, recovering thereby the image representation expressed by the $N_1'$ and $N_2'$ parameters.

The recovered image representation is transferred back to the checking terminal. The comparing and decision-making device 25 compares the said image with the image representation obtained as a result of check scanning by the scanner 6 of the imprinted image and processing in the DIB processor 16 by the N1 and N2 parameters. The result of comparing of the $N_1'$ and $N_2'$ parameters with the $N_1$ and $N_2$ parameters is analyzed for making decision on authenticity or counterfeit of an article. In the process are estimated permissible deviations of parameters values caused by wearout of a label, inaccuracy of scanning, etc.

A marking station may be located either at an enterprise-producer or at a centralized storage, or in special station for certifying documents, e.g. notary's office, etc.

The identification station should be reasonably secure to ensure protection of the stored information, keys and testing data and other information.

The checking terminal may be arranged as accessible to public terminals, such as bancomats, located in large shopping centers or other public facilities.

In accordance with the invention, the Internet, telephone, designated local or other networks may be used for communication. Protected communication channels are preferable.

Thus, under the proposed method and the system based on it, authentication of articles and/or documents is performed with use of standard technical means. At the same time counterfeit-protection is ensured on the account of unique images, imprinted on a carrier with random three-dimensional structure. This combination, together with use of a system of remote secure control center with theoretically crypto-resistant private keys, provides a reliable counterfeit-protection.

Finally, the system provides counterfeit-protection of goods and documents without using any complex and specific physical protection means. This fact makes the system obtainable, moderate and cheap.

From the foregoing it will be understood that the invention provides a highly effective method and system for counterfeit-protection of articles and documents. While the invention has been described in its presently preferred form, it will be understood that the invention is capable of modification without departing from the spirit of invention as set forth in the attached claims.

What is claimed is:

1. A method for marking articles, comprising generating private keys;

storing the said keys in the database;

generating an image for each sample of an article;

applying the image on to the marked surface;

reading the resulting image;

obtaining data on the readout image;

encrypting;

characterized in that an image is generated per each sample of an article, as a unique and random at least two-dimensional image;

the said generated random two-dimensional image is applied on to a selected area made of material having a roughness surface with random parameters;

the data on the readout image are encrypted; and the resulting code is applied on to the marking surface.

2. A method for marking articles, comprising generating private keys;

storing the said keys in the database;

generating a image for each sample of an article;

applying the image on to the marked surface;

reading the resulting image;

obtaining data on the readout image;

encrypting;

characterized in that a image is generated per each sample of an article, as a unique and random at least two-dimensional image;

the said generated random two-dimensional image is applied on to a selected surface area; and thereafter the surface with the applied image is modified until a irregular three-dimensional texture is formed;

the resulting image is readout after the surface is modified; and thereafter the data on the readout image are encrypted; and the resulting code is applied on to the marking surface.

3. The method for marking according to claim 2, characterized in that the surface is modified until a steady texture of random parameters is formed.

4. The method for marking according to claim 2, characterized in that the surface is modified by perforation.

5. The method for marking according to claim 2, characterized in that the surface is modified by embossing.

6. The method for marking according to claim 2, characterized in that the surface is modified by electrospark machining.

7. The method for marking according to claims 1 or 2, characterized in that as a marking material is used a label with a selected area of a three-dimensionally patterned material, such as a porous material having capillary features.

8. The method for marking articles according to any of claims 1–6, characterised in that generating private keys, data encrypting and data storing is effected in a remote control center;

applying the image, scanning the resulting image and applying the encrypted code is performed by a marking means;

the marking means transmits data on the image to the control center, while the control center transmits the encryption result to the marking means; data transfer between the marking means and the control center is effected through communication channels.

9. The method for marking articles according to any of claims 1–6, characterised in that generating private keys, data encrypting, generating a random image, applying the image on to the marked surface, reading the resulting image and applying the encrypted code on to the marked surface is performed by the marking means;

data transferring to the control center is also effected by the marking means, while at least keys are transferred to the control center through the path ensuring confidentiality;

the control center stores the keys and codes in the database.

10. The method for marking articles according to any one of claims 2–6, characterized in that generating private keys; data encrypting and storing is affected in the remote control center;

applying the image, modifying the surface texture with the applied image, scanning the resulting image and applying the code is performed by the marking device;

data exchange between the marking means and the control center is performed over communication channels.

11. The method for marking articles according to claim 1, characterized in that generating private keys; data encrypting, as well as applying the image, scanning the resulting image and applying the code is performed by the marking device;

the marking means transmits the data on the image to the control center, which stores them in the database; at least the keys are transferred to the control center by the path ensuring confidential transmission.

12. The method for identification, at an article checking terminal, of articles marked according to any of claims 1–6, comprising reading a marking image and transforming it into data reading an encrypted code;

decrypting (recovery of the image data against the readout code);

comparing the recovered data with the readout image data characterised in that an additional criterion of existence of a respective texture on the image is specified when identification, thereafter the image is readout.

13. The method for identification according to claim 12, characterized in that reading the marking image, reading the encrypted code and specifying the criterion of texture existence is effected at the checking terminal; the readout image data and the readout encrypted code are transferred to the control center, decrypting (recovery of the image data against the readout code), comparing the recovered image with the data of the readout image is effected in the remote control center.

14. The method for identification according to claim 12, characterized in that reading the marking image, reading the encrypted code and specifying the criterion of texture existence is effected at the checking terminal; the readout code data being transferred to the control center, decrypting (recovery of the image data against the readout code) is effected in the remote center, and the recovered checking result is transmitted to the checking terminal;

comparing the recovered data with the data of the readout identification image is effected in the checking terminal.

15. The method for identification of articles according to any of claim 12, characterized in that errors are estimated in the process of comparing, and a decision is made on basis of a preset criterion.

16. A method for authentication and detection of counterfeited articles comprising the steps of:

pre-marking of articles by applying a unique two-dimensional image on to the marking space;

reading the resulting image, transferring data on the image to the remote control center;

data encrypting;

data storing in database;

re-reading the unique image at least in one of the remote checking terminals;

data transfer to the control center, characterized in that a unique marking image is obtained by the following steps:

generating a unique image as a random at least two-dimensional image;

applying the generated random image to a surface having a texture with irregular parameters;

reading the resulting image;

transferring data on the readout image to the remote control center;

generating private keys;

encrypting the obtained unique image data by means of private keys;

transferring the resulting code to the marking station;

applying the resulting code on to the marking surface;

storing the keys in the control center database;

verifying the existence and the pattern of the texture on the marking surface in the checking terminal; and then test reading of the marking image and the applied code;

transferring the code data to the control center;

decrypting the code data on the and recovering the data on the readout images;

transferring the recovered data to the checking terminal;

comparing the recovered data with the data on the readout image;

marking decision on the authenticity of the article.

17. A method for authentication and detection of counterfeited articles comprising the steps of:

pre-marking of articles by applying a unique two-dimensional image on to the marking space;

reading the resulting image, transferring the image data to the remote control center;

data encrypting;

storing data in the control center database;

re-reading the unique image at least in one of the remote checking terminals;

data transfer to the control center;

data comparing with the data stored in the database;

transferring the result of comparing to the checking terminal;

characterized in that a unique marking image is obtained by the steps of:

generating a unique image as a random at least two-dimensional image;

applying the generated random image to a surface having a texture with irregular parameters, reading the resulting image;

transferring data on the readout image to the remote control center;

generating private keys;

encoding the obtained unique image data by means of private keys;

transferring the encoded image to the marking station;

applying the resulting code on to the marking surface;

storing the keys in the control center database;

verifying the existence and the pattern of the texture on the marking surface; and then rest reading the marking image and the applied code;

transferring the readout image data and the code to the control center;

decrypting the code data and recovering the readout image data;

comparing the recovered data on the image received after the check reading;

transferring the result of comparing to the checking terminal.

18. The method for authentication according to claim 16 or 17, characterized in that the data on the performed tests are stored in the control center; the number of the same code tests being summarized, and when the set value is exceeded, a signal warning on the exceedence is produced.

19. The system for authentication of articles according to claim 1, comprising a marking means, including a printer, a printer control device, a readout device, an image processing unit, a communication means; and a remote processing and storage center, comprising, a key generating unit, an encrypting/decrypting unit, a memory unit, a compare facility, and blank parts for labels, characterized in that the marking device further includes a random image generating device, means for applying an encrypted code; and as blank parts for labels are used substrates made of material having a texture with random parameters.

20. The system for authentication of articles according to claim 2, comprising a marking means including a printer, a printer control device, a readout device, an image processing unit, a communication means; and a remote processing and storage center, comprising, a key generating unit, an encrypting/decrypting unit, a memory unit, a compare facility, and blank parts for labels, characterized in that the marking device further includes a random image generating device, means for applying an encrypted code; and means for transforming surfaces of labels into three-dimensional texture with random parameters.

* * * * *

UNITED STATES PATENT AND TRADEMARK OFFICE
CERTIFICATE OF CORRECTION

| | |
|---|---|
| PATENT NO. | : 6,928,552 B1 |
| APPLICATION NO. | : 09/890846 |
| DATED | : August 9, 2005 |
| INVENTOR(S) | : Valentin Alexandrovich Mischenko and Ihar Anatolievich Hrishanovich |

It is certified that error appears in the above-identified patent and that said Letters Patent is hereby corrected as shown below:

On The Title Page, Item -76-
Under the Heading "Inventors", add -- Anatoly Valentinovich Mischenko -- .

Signed and Sealed this

Twelfth Day of June, 2007

JON W. DUDAS
*Director of the United States Patent and Trademark Office*